(12) United States Patent
Kevenaar et al.

(10) Patent No.: US 8,412,950 B2
(45) Date of Patent: Apr. 2, 2013

(54) DEFINING CLASSIFICATION THRESHOLDS IN TEMPLATE PROTECTION SYSTEMS

(75) Inventors: Thomas Andreas Maria Kevenaar, Eindhoven (NL); Bart Johan Hendrikus Bouwman, Helmond (NL); Joseph Gerard Hubert Strous, Breda (NL); Minne Van Der Veen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 299 days.

(21) Appl. No.: 12/808,579

(22) PCT Filed: Dec. 17, 2008

(86) PCT No.: PCT/IB2008/055388
§ 371 (c)(1),
(2), (4) Date: Jun. 16, 2010

(87) PCT Pub. No.: WO2009/081338
PCT Pub. Date: Jul. 2, 2009

(65) Prior Publication Data
US 2010/0306550 A1    Dec. 2, 2010

(30) Foreign Application Priority Data
Dec. 20, 2007    (EP) ..................................... 07123836

(51) Int. Cl.
*H04L 29/06*    (2006.01)
(52) U.S. Cl. .......................... 713/186; 714/752; 714/809
(58) Field of Classification Search .................. 713/186; 714/752, 809
See application file for complete search history.

(56) References Cited

U.S. PATENT DOCUMENTS

| | | | |
|---|---|---|---|
| 2003/0115473 A1* | 6/2003 | Sugimura et al. .............. | 713/186 |
| 2004/0107398 A1* | 6/2004 | Johnson ......................... | 714/758 |
| 2007/0150745 A1* | 6/2007 | Peirce et al. ................... | 713/186 |
| 2008/0040614 A1* | 2/2008 | Abe ................................ | 713/186 |
| 2008/0089562 A1* | 4/2008 | Monden ......................... | 382/124 |

FOREIGN PATENT DOCUMENTS

WO    2004104899 A2    12/2004

OTHER PUBLICATIONS

Kevenaar et al., "Face recognition with renewable and privacy preserving binary templates," Oct. 2005, Automatic Identification Advanced Technologies, 2005. Fourth IEEE Workshop, pp. 21-26.*
Hao et al: "Combining Cryptography With Biometrics Effectively": University of Cambridge-Computer Library, vol. 28, No. 640, Jul. 2005, 17 Page Document.
Dodis et al: "Fuzzy Extractors: How to Generate Strong Keys From Biometrics and Other Noisy Data"; Lecture Notes in Computer Science. vol. 3027, Jan. 2004, 20, pp. 523-540.
Arakala et al: "Fuzzy Extractors for Minutiae-Based Fingerprint Authentication"; Advances in Biometrics; Lecture Notes in Computer Science, Aug. 2007, vol. 4642, pp. 760-769.
Uludag et al: "Biometric Cryptosystems: Issues and Challenges"; Proceedings of the IEEE, vol. 92, vol. 6, Jun. 2004, pp. 948-960.
Chang et al: "Hiding Secret Points Amidst Chaff"; Advances in Cryptology, Eurocrypt 2006, Lecture Notes in Computer Science, vol. 4004, pp. 59-72.

* cited by examiner

*Primary Examiner* — Kambiz Zand
*Assistant Examiner* — Michael Guirguis

(57) ABSTRACT

A method for configuring a biometric template protected authentication system wherein the desired classification threshold is first selected to optimize the trade-off between a false accept (FAR) and a false non match or reject rate (FRR) of the system, and then an error correcting code (ECC) used in the authentication process is chosen such that the number of errors which can be corrected is equal to or greater than the selected classification threshold. During authentication, the number of errors in a first codeword derived from biometric data associated with a physical object is determined and used in the decision process to accept or reject authentication.

10 Claims, 4 Drawing Sheets

DEFINING CLASSIFICATION THRESHOLDS IN TEMPLATE PROTECTION SYSTEMS

FIELD OF THE INVENTION

This invention relates generally to authentication of a physical object in a template protection system such as a biometric template protection system for a template protection system employing physically unclonable functions (PUFs).

BACKGROUND OF THE INVENTION

Authentication of physical objects may be used in many applications, such as conditional access to secure buildings or conditional access to digital data (e.g. stored in a computer or removable storage media), or for identification purposes (e.g. for charging an identified individual for a particular activity). Every human being has a unique set of biometric data, such as voice, fingerprints, iris, retina, face, etc. The use of biometrics is, to an ever-increasing extent, considered to be a better alternative to traditional identification means, such as passwords and PIN-codes and, indeed, biometric information is increasingly used to verify and authenticate a person's identity in an ever-growing number of applications and situations.

Typically, the use of biometric information is governed by a trust model, whereby a user receives assurances that the information as provided will only be used for specific purposes and that abuse will be prevented by a security regime for the data. Unfortunately, while in theory this should provide a complete solution that addresses all concerns from citizens and the privacy community, in practice every security regime becomes vulnerable when deployed on a large scale, and widespread use inevitably leads to insider abuse and outside attacks, e.g. by hackers. It will be apparent that biometric applications are a tempting target for identity thieves, so traditional biometric systems have protected biometric templates by storing them in encrypted form. Thus, in order to check the identity of an individual, the template must be decrypted using a key before it can be compared with a live scan. This gives potential identity thieves two opportunities to access the template: intercepting the unencrypted template or stealing the encrypted template and key.

Therefore, the concept of providing intrinsic security by means of biometric encryption, whereby rather than using the original biometrics, a derived dataset is used that has been created via a one-way transformation. The one-way properties of the transformation guarantee that the original biometrics can never be reconstructed from the stored data, while the transformations are unambiguous enough to be able to perform matches in the encrypted domain.

International application WO 2004/104899 (PHNL030552) discloses template protection for authentication of a physical object.

In an authentication system with template protection a so-called helper data and a control value are used for authenticating a physical object. Both are generated during enrolment and are used instead of the actual template data. The helper data is generated using the template data, but characteristics of the template data are obfuscated in such a way that there is hardly any correlation between the template data and the helper data. The control value is generated in parallel with the helper data and serves as a control value for the authentication process.

The helper data and control value are used during authentication. First the helper data is combined with data acquired from the physical object (e.g. facial feature data). The combined data is subsequently "condensed" into a second control value. This second control value is matched with the control value generated during enrolment. When these control values match the authentication is said to be successful.

The authentication process verifies whether the metric obtained from the physical object during authentication sufficiently matches the template data. Assume the physical object is the same as the reference object, the combined data (helper data and metric data) are passed to a noise compensating mapping to compensate for measurement noise in the metric data.

The noise compensating mapping determines to a large extent whether or not a sufficient match is found between the physical object and the reference object.

Authentication methods that employ template protection by means of helper data comprise a noise robust mapping applied during enrolment for generating the helper data and a noise compensating mapping applied during authentication. The noise robust mapping is used to provide resilience to measurement errors in the (bio)metric data acquired from the physical object. The noise compensating mapping can be interpreted as the inverse of the noise robust mapping, where the noise robust mapping adds noise resilience, the noise compensating mapping uses this to reconstruct the original message in the presence of noise. Provided the noise robust mapping is sufficiently robust, or the measurement noise is sufficiently small, successful authentication is possible.

Referring to FIG. 1 of the drawings, there is provided a schematic diagram illustrative of the basic operation of an exemplary solution in this class of approaches to secure biometrics. As shown, during an enrolment phase, the biometric 10 is first scanned and transformed into a regular biometric feature vector. The signal-to-noise ratio is estimated and used (at 12) to reduce the noise levels and template size without losing useful information. Next, error-correction codes are used (at 14) to eliminate remaining noise effects and minimize authentication errors, thereby ensuring, to the greatest extent possible, exact matching between templates and corresponding, subsequently-acquired biometric data. Auxiliary data is then combined (at 16) with the feature vector, thereby enabling different templates to be created from the same biometric. This auxiliary data is essentially a random number but, importantly, that number can be different for each person and application. Finally, part of the auxiliary data is hashed (at 18) for secure storage. With auxiliary information, each biometric can give rise to many different templates, so any compromised template can simply be revoked and replaced with a new one using the same biometric 10 but different auxiliary information. Furthermore, as each resultant template is radically different, an identity thief who gains access to one template will not be able to use that template to access other applications.

The enrolled biometric data is defined as the biometric template and can be seen as discriminative features derived from the original biometric information. During an authentication phase, a person provides biometric information as proof of their identity, and a biometric template is generated. The measured biometric template is then compared with the stored biometric template to authenticate the identity of the person. The comparison can be done in many ways, but it usually involves some form of distance measure. Thus, using a threshold $\delta$, it is possible to determine if the two templates are closely matched enough to authenticate the person.

Referring to FIG. 2 of the drawings, there is presented a general scheme for biometric authentication with template protection. FIG. 2 depicts an enrolment process ENRL on the left hand side, during which helper data W and a control value V are generated for the object being enrolled. This data is subsequently stored in the authentication data set ADS, located in the middle. During the authentication process AUTH, depicted on the right hand side, a physical object (not shown in FIG. 2) with an alleged identity is authenticated.

Initially the authentication data set ADS is searched for a reference object with the alleged identity. If there is no such reference object the authentication will fail. Provided the reference object is found, a first helper data W1 and an accompanying first control value V1 associated with the alleged identity are retrieved from the authentication data set ADS. This data is used to decide whether or not the physical object being authenticated sufficiently matches the reference object, resulting in a positive authentication.

Assume that the helper data system is used to authenticate persons using biometric data in the form of fingerprint data. Furthermore assume that the biometric template data comprises a graphical representation of the lines and ridges of the core area of the fingerprint. Issues such as orientation and localization of the core area during acquisition are beyond the scope of this description.

During the enrolment process ENRL a person presents their finger to a fingerprint scanner. The result from one or more fingerprint scans is used to construct a biometric template X. In addition, a property set S is chosen. The property set S is mapped onto a property set C by means of a noise robust mapping facilitated by an Error Correction Code (ECC) encoder $ECC_e$.

Subsequently, the property set C is combined with biometric template X to produce helper data W. In a practical helper data system the property set S and the noise robust mapping are chosen such that the resulting helper data W exhibits little or no correlation with the biometric template data X. As a result, the use of helper data does not expose the biometric template data to malicious users.

To enable authentication, the enrolment process also involves the generation of a control value V. Control value V is generated using the property set S. Although the control value V can be identical to the property set S, this is not advisable in systems where security is an issue. In a secure helper data system, it should not be possible to reconstruct the property set S using the control value V. This requirement is satisfied when the control value V is generated by application of a one-way mapping on the property set S. A cryptographic hash function is a good example of such a one-way mapping. If security is not critical a non one-way mapping could be used. Finally the pair of helper data W and control value V are stored in the authentication data set ADS.

Although a particular object can be identified using a single pair of helper data W and control value V, it is possible that a particular object can be identified using multiple pairs of helper data and control values. Additional helper data and control value pairs can be generated easily by selecting different property sets S. Multiple helper data and control value pairs can be particularly useful for managing access levels or for system renewal. For now assume a situation in which the authentication data set comprises only a single helper data and control value per enrolled object.

During the authentication process AUTH a biometric data Y (fingerprint) from a physical object (not shown in FIG. 2) is acquired. In addition an alleged identity is provided. The next step is to check whether the authentication data set ADS contains a first helper data W1 and a first control value V1 for a reference object with said alleged identity. If this is the case the first helper data W1 and the first control value V1 associated with the reference object are retrieved.

Next the biometric data Y from the physical object is combined with the first helper data W1 resulting in a first property set C1. In case the physical object corresponds to the reference object the biometric data Y can be interpreted as a noisy version of the biometric template X:

$$Y=X+E \text{(where } E \text{ is small)}$$

The first helper data W1 can be represented by template data X and property set C:

$$W1=C-X$$

By substitution the first property set C1 can be written as:

$$C1=C-X+Y$$

$$C1=C-X+X+E$$

$$C1=C+E$$

The first property set C1 is passed to the noise compensating mapping in the form of an ECC decoder $ECC_d$ to produce a second property set S1. Now assume that the reference object corresponds with the physical object. As long as the noise component E present in the biometric data Y is sufficiently small, or alternatively the noise robust mapping used in the ECC encoder is sufficiently robust, the ECC decoder will reconstruct a second property set S1 that is identical to the original property set S as used during enrolment for generating the first helper data W1.

The first property set S1 is subsequently used to compute a second control value V2 in a similar fashion as the first control value V1. Next second control value V2 is compared with the first control value V1 generated during enrolment. Provided the ECC encoder provides sufficient resilience to noise the second control value V2 will be identical to the first control value V1. If these values are identical, the authentication is successful, and the identity of the physical object is established as being the alleged identity.

Performance of a biometric measure is usually referred to in terms of the false accept rate (FAR), the false non match or reject rate (FRR), and the failure to enroll rate (FTE or FER). The FAR measures the percent of invalid users who are incorrectly accepted as genuine users, while the FRR measures the percent of valid users who are rejected as impostors. In real-world biometric systems the FAR and FRR can typically be traded off against each other by changing some parameter. In template protection methods such as that described above, biometric measurements are represented as binary strings or symbol strings that can be classified using a Hamming Distance (HD) classifier. In almost all biometric applications, it is required that the HD value can be ideally selected to obtain the optimum trade-off between FAR and FRR for a particular application. As described above, in template protection methods, a HD classifier is implemented as an error correcting code (ECC) such that, in effect, the HD classification threshold is equal to the number of errors k the ECC can correct. In practical implementations of ECCs, only a few values of k are possible which has the effect of making a template protected system inflexible with regard to the choice of classification threshold and, therefore, makes it difficult in many cases to select a classification threshold that gives the optimal trade-off between FAR and FRR for a particular application.

It is therefore an object of the present invention to provide a template protection method and system for authentication which enables any one of a plurality of HD classification thresholds to be selected, up to the maximum number of errors for which the ECC can correct for a given bit string length, so as to enable the trade-off between FAR and FRR to be optimized for a particular application.

SUMMARY OF THE INVENTION

Thus, in accordance with the present invention, there is provided a method of configuring a biometric template protected authentication system for authenticating a physical object, the method comprising:
  selecting a required classification threshold;
  providing noise compensating means for receiving a first property set derived from biometric data associated with said physical object, said noise compensating means being selected such that the number of symbol errors capable of being corrected thereby is equal to or greater than said classification threshold;
  providing means for determining the number of symbol errors in said first property set; and
  providing decision means for accepting or rejecting authentication based on at least said number of symbol errors in said first property set.

Also in accordance with the present invention, there is provided a method of authentication of a physical object in a biometric template protection system, the method comprising:
  receiving a first property set derived from biometric data associated with said physical object and generating a second property set using a noise compensating mapping on information comprising said first property set;
  determining the number of symbol errors in said first property set; and
  rejecting authentication if said number of symbol errors in said first property set is greater than a predetermined threshold, wherein said predetermined threshold is equal to or less than the number of errors which said noise compensating mapping is capable of correcting.

Also in accordance with the present invention, there is provided an apparatus for authentication of a physical object in a biometric template protection system, the apparatus comprising:
  means for receiving a first property set derived from biometric data associated with said physical object and generating a second property set using a noise compensating mapping on information comprising said first property set;
  means for determining the number of symbol errors in said first property set; and
  decision means configured to reject authentication if said number of symbol errors in said first property set is greater than a predetermined threshold, wherein said predetermined threshold is equal to or less than the number of errors which said noise compensating mapping is capable of correcting.

The present invention also extends to a biometric template protected authentication system, configured in accordance with the method defined above.

It will be appreciated that a symbol may consist of one or more bits. It will be apparent to a person skilled in the art that brinary or non-binary noise compensating mapping (ECC) may be used and the present invention is not necessarily intended to be limited in this regard. In the case of non-binary ECC, the ECC works on the symbol level rather than the bit level.

Thus, it can be seen, that by means of the method and system of the present invention, the classification threshold can be arbitrarily selected to optimize the trade-off between the FAR and FRR for any template protected system.

In an exemplary embodiment of the present invention, authentication of said physical object is performed using helper data and a first control value associated with a reference object, wherein said first property set is generated using information that comprises said helper data and a metric associated with said physical object. The method may further comprise the step of establishing a sufficient match between the reference object and the physical object using the second property set and the first control value. In this case, a second control value may be generated by applying a transformation to the second property set.

The decision means is preferably configured to reject authentication if the first and second control values are not substantially equal. In one exemplary embodiment, the noise compensating mapping means, preferably in the form of an error-correcting code decoding means, is configured to provide information indicative of the number of bit errors in said first property set. Alternatively, however, means may be provided for receiving the second property set and generating a third property set using a noise robust mapping, and the number of bit errors in the first property set may then be determined by determining the difference between said first and third property sets.

These and other aspects of the present invention will be apparent from, and elucidated with reference to, the embodiments described herein.

BRIEF DESCRIPTION OF THE DRAWINGS

Embodiments of the present invention will now be described by way of examples only and with reference to the accompanying drawings, in which.

DETAILED DESCRIPTION

Figure 1:
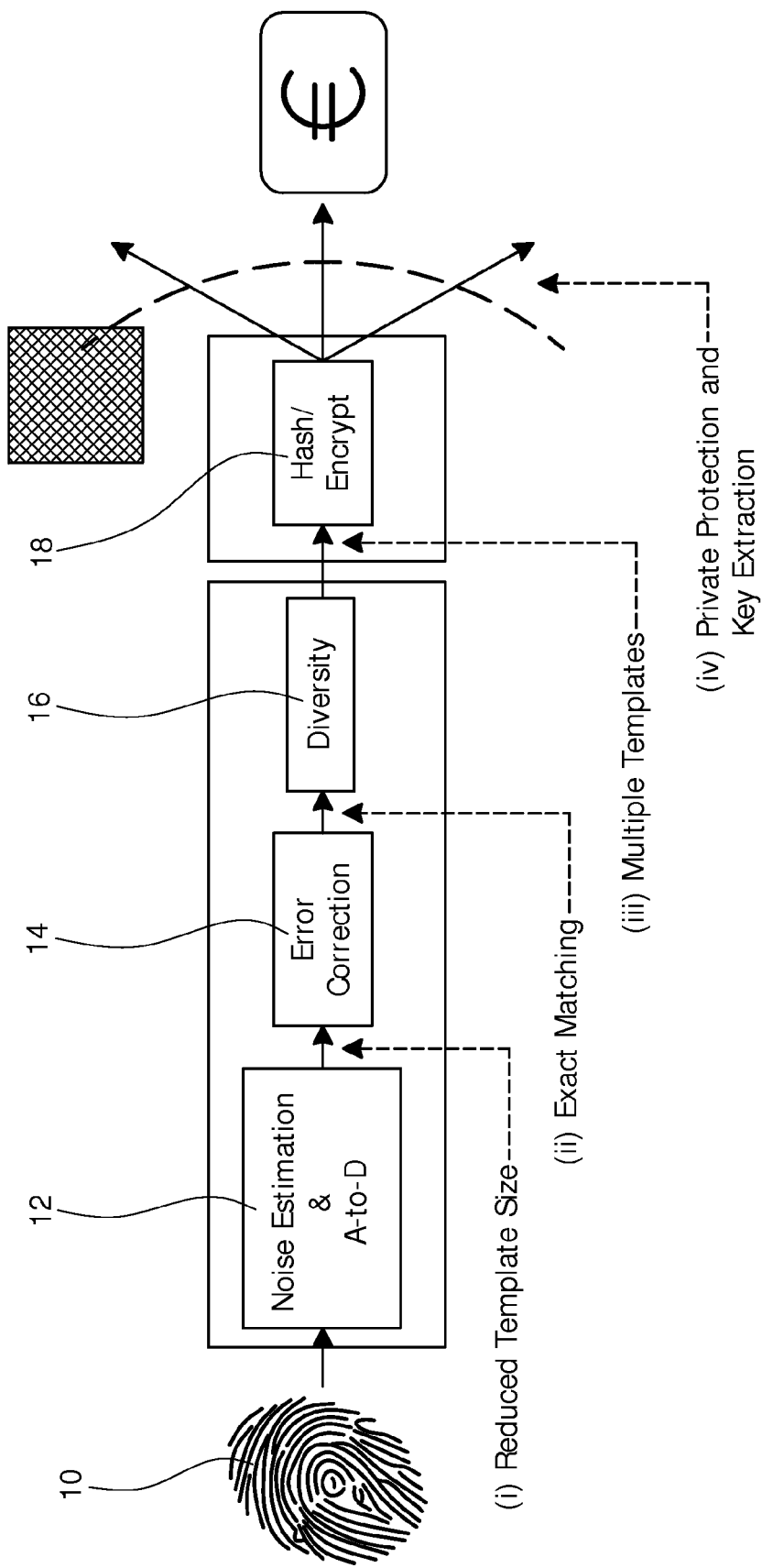
FIG. 1 is a schematic diagram illustrating the principal steps of a biometric encryption method.
Figure 2:
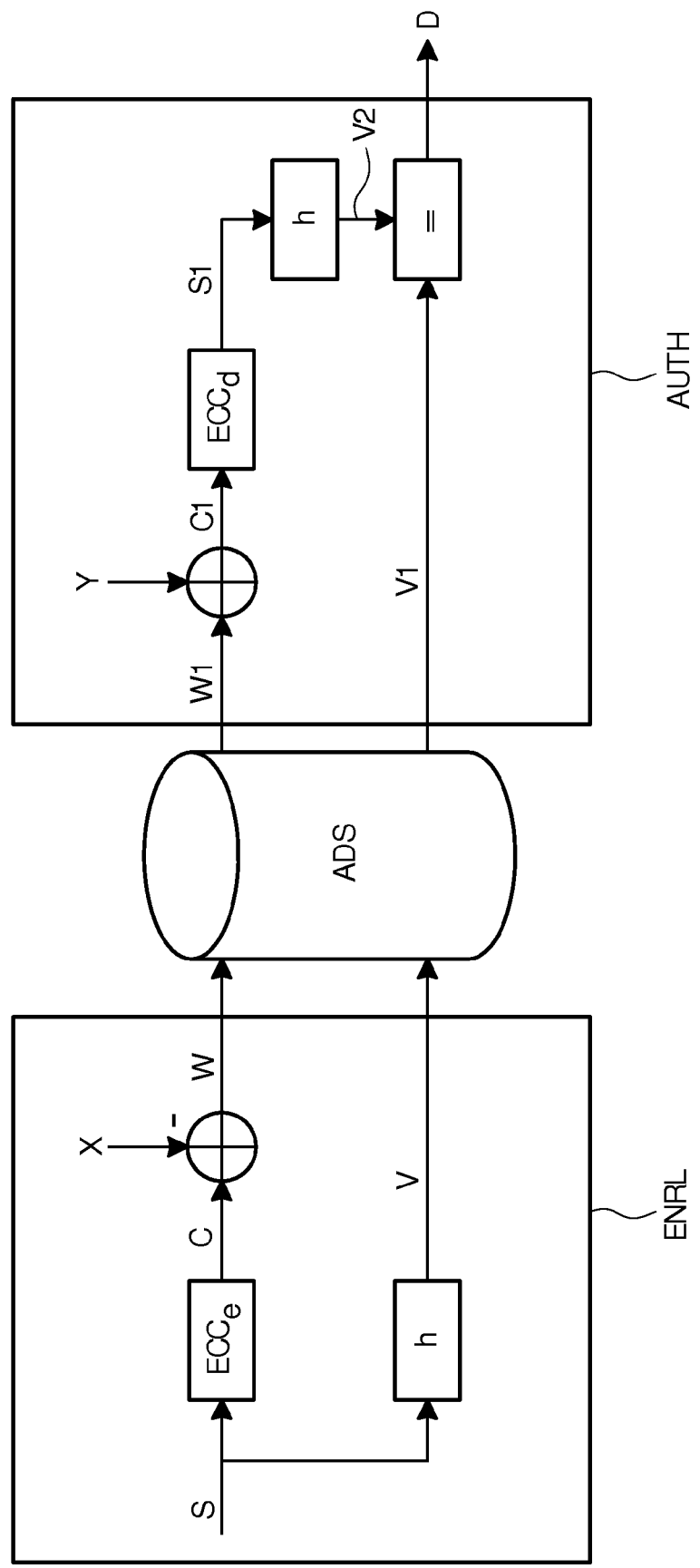
FIG. 2 is a block diagram of the enrolment and authentication process in an authentication system for a physical object employing template protection according to the prior art.
Figure 3:
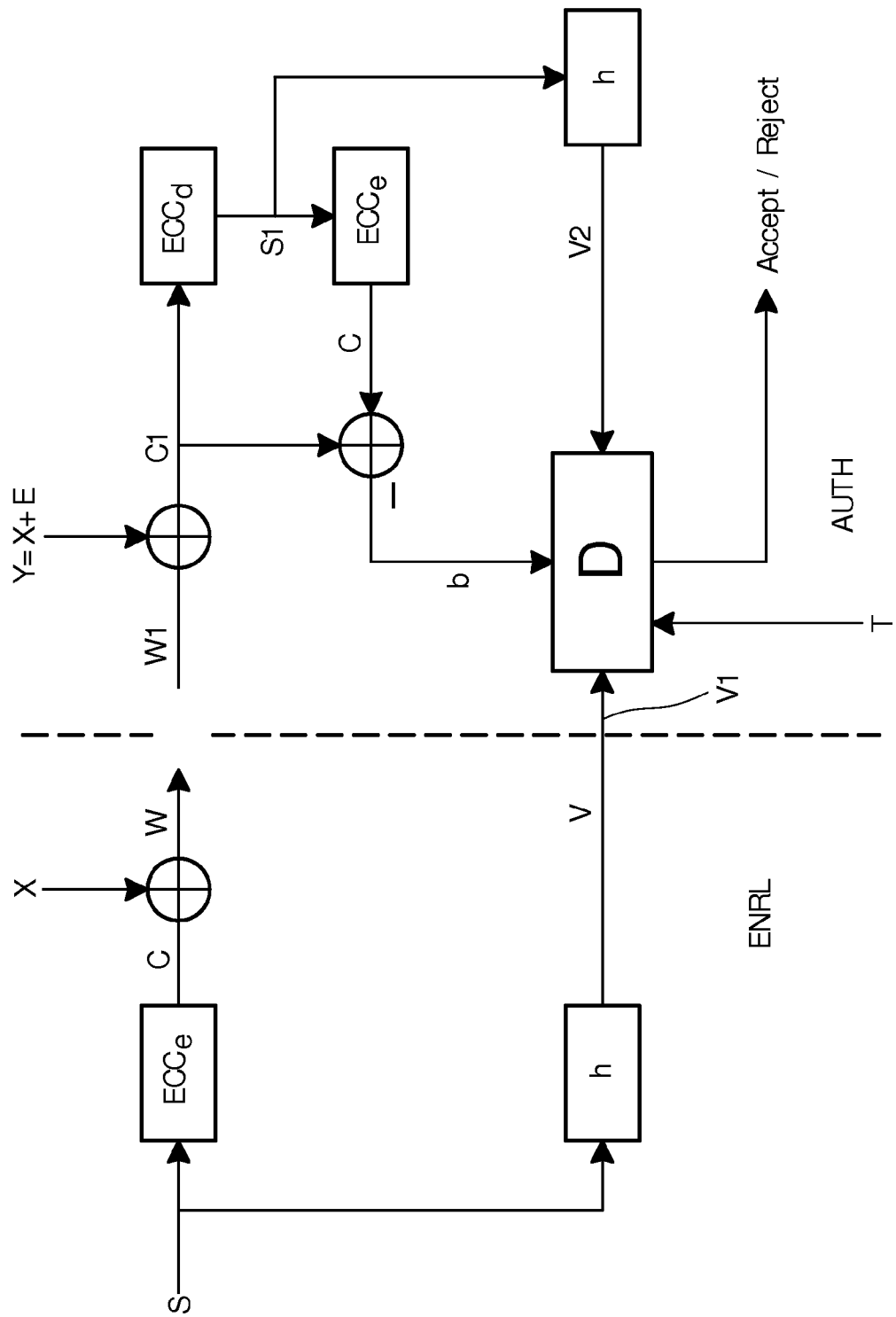
FIG. 3 is a block diagram of an enrolment and authentication process in an authentication system for a physical object employing template protection according to an exemplary embodiment of the present invention.

Referring to FIG. 3 of the drawings, once again assume that the helper data system is used to authenticate persons using biometric data in the form of fingerprint data. Furthermore, assume that the biometric template data comprises a graphical representation of the lines and ridges of the core area of the fingerprint. Issues such as the orientation and localization of the core area during acquisition are once again beyond the scope of the present description.

As before, during the enrolment process ENRL, a person presents his or her finger to a fingerprint scanner. The result from one or more fingerprint scans is used to construct a biometric template X. In addition, a possibly secret property set S is chosen. The property set S is mapped onto a property set C by means of an ECC encoder $ECC_e$. Prior to this process, the system designer selects an arbitrary classification threshold T that will optimize the trade-off between FAR and FRR for the particular application, and then chooses an ECC that can correct k errors such that $k \geq T$.

Next, the property set C is combined with biometric template X to produce helper data W.

As before, to enable authentication, the enrolment process also involves the generation of a control value V, which is generated using the property set S. Finally, the pair of helper data W and control value V are stored in an authentication data set (not shown in FIG. 3).

During the authentication process AUTH, biometric data Y in the form of a fingerprint from a physical object (not shown in FIG. 3) is acquired. In addition, an alleged identity is provided. The next step is to check whether the authentication data set contains a first helper data W1 and a first control value V1 for a reference object with the alleged identity. If this is the case, the first helper data W1 and the first control value V1 associated with the reference object are retrieved.

Next, the biometric data Y from the physical object is combined with the first helper data W1 resulting in a first property set C1. In case the physical object corresponds to the reference object, the biometric data Y can be interpreted as a noisy version of the biometric template X:

$$Y=X+E \text{(where } E \text{ is small)}$$

The first helper data can be represented by template data X and the property set C:

$$W1=C-X$$

By substitution, the first property set C1 can be written as:

$$C1=C-X+Y$$

$$C1=C-X+X+E$$

$$C1=C+E$$

The first property set C1 is passed to an ECC decoder $ECC_d$ to produce a second property set S1. As long as the noise component E present in the biometric data Y is sufficiently small, or alternatively the noise robust mapping used in the ECC encoder is sufficiently robust, the ECC decoder will reconstruct a second property set S1 that is identical to the original property set S as used during enrolment for generating the first helper data W1.

The first property set S1 is subsequently used to compute a second control value V2 in a similar fashion as the first control value V1.

In addition, in the example shown, S1 is used to determine the number of errors b in C1 by ECC encoding S1 to obtain a codeword C and comparing the codeword C (=ENC(S1)) with C1. However, it will be appreciated by a person skilled in the art that, in many cases, ECC decoders can produce the number of corrected errors b without explicitly performing ECC encoding in respect of S1.

The first control value V1, the second control value V2, the selected classification threshold T and the number of corrected errors in C1 are fed to a decision processor D for use thereby to determine whether the authentication is successful or unsuccessful. Such a decision can be made relatively simply, as follows:

if V1≠V2, then reject authentication and exit;

if b>T, then reject authentication and exit;

else
accept authentication

As a result, all authentications with a HD greater than T will be rejected.

Thus, it can be seen, that by means of the method and system of the present invention, the classification threshold can be arbitrarily selected to optimize the trade-off between the FAR and FRR for any template protected system. It will be appreciated by a person skilled in the art that the principle of the present invention is applicable to many different configurations of authentication systems, and the present invention is not necessarily intended to be limited in this regard.

Figure 4:
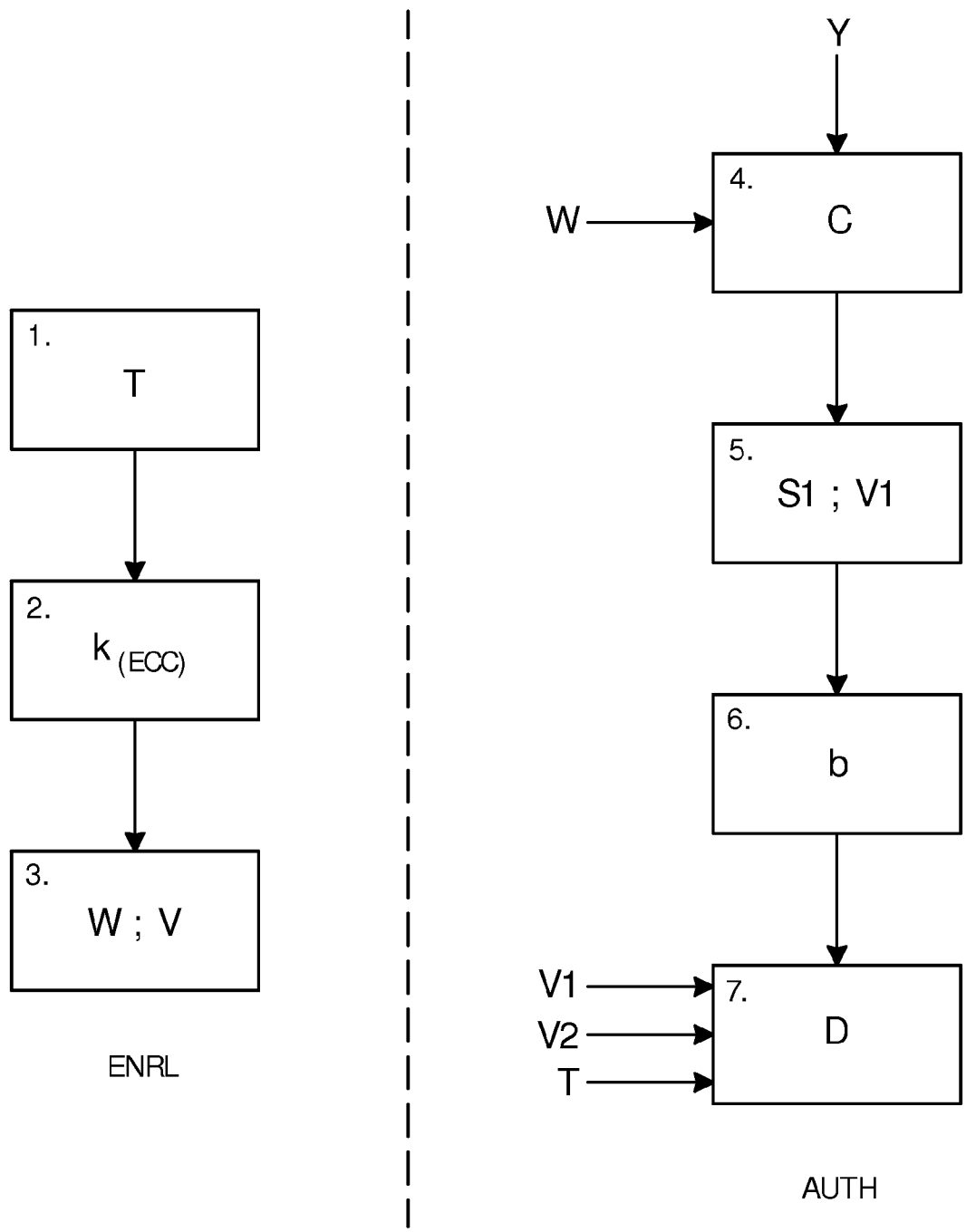
FIG. 4 is a schematic flow diagram illustrating the principal steps of an authentication process performed by the system of FIG. 3.

Referring to FIG. 4 of the drawings, key elements of the method according to an exemplary embodiment of the present invention can be summarized as follows:
1. (ENR) choose an arbitrary HD (classification) threshold to optimize the trade-off between FAR and FRR for the particular application;
2. (ENR) choose an ECC that can correct k errors, where k≧T;
3. (ENR) generate helper data W and control value V using secret S;
4. (AUTH) obtain a codeword C1=Y+W;
5. (AUTH) decode C1 and obtain the result S1 and V2
6. (AUTH) obtain the number of errors b in the codeword C1 (in this case as compared with ENC(S1));
7. (AUTH) use V1, V2, T and b to decide if the authentication is successful or unsuccessful.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of configuring a biometric template protected authentication system for authenticating a physical object in a plurality of applications, the method comprising acts of:
    enrolling the physical object by
        selecting a classification threshold to achieve a desired trade-off between a false accept rate (FAR) and a false reject rate (FRR) for one of the plurality of applications, and
        providing noise compensating mapping for correcting a maximum number of symbol errors equal to or greater than said classification threshold;
    authenticating the physical object by
        obtaining a first property set from biometric data associated with said physical object and helper data generated during enrolling of the physical object,
        generating a second property set by performing said provided noise compensating mapping on the first property set,
        determining a second number of symbol errors in said first property set; and
    rejecting authentication when said second number of symbol errors in said first property set is greater than the classification threshold.

2. A method of authentication of a physical object in a biometric template protection system for use in plurality of applications, the method comprising acts of;

obtaining a first property set from biometric data associated with said physical object and helper data generated during enrolment of the physical object;

generating a second property set by performing a noise compensating mapping on said first property set;

determining a second number of symbol errors in said first property set; and rejecting authentication if said second number of symbol errors in said first property set is greater than a predetermined threshold, the threshold is predetermined to achieve a desired trade-off between a false accept rate (FAR) and a false reject rate (FRR) for one of the plurality of applications, wherein the performed noise compensating mapping is selected during enrolment of the physical object for correcting a maximum number of symbol errors equal to or greater than said predetermined threshold.

3. The method according to claim 2, further comprising an act of generating helper data and a first control value associated with the physical object during enrolment of the physical object.

4. The method according to claim 3, further comprising an act of establishing a sufficient match between an enrolled physical object and the physical object being authenticated using the second property set and the first control value.

5. The method according to claim 4, further comprising an act of generating a second control value by applying a transformation to the second property set.

6. The method according to claim 5, further comprising an act of denying authentication when the first and second control values are not equal.

7. An apparatus for authentication of a physical object in a biometric template protection system for use in a plurality of applications, the apparatus comprising:

a decoder for obtaining a first property set from biometric data associated with said physical object and helper data generated during enrolment of the physical object;

generating a second property set by performing a noise compensating mapping on said first property set; and a processor for determining a second number of symbol errors in said first property set; and rejecting authentication if said second number of symbol errors in said first property set is greater than a predetermined threshold, the threshold is predetermined to achieve a desired trade-off between a false accept rate (FAR) and a false reject rate (FRR) for one of the plurality of applications, wherein the performed noise compensating mapping is selected during enrolment of the physical object for correcting a maximum number of symbol errors equal to or greater than said predetermined threshold.

8. The apparatus according to claim 7, wherein said decoder is configured to provide information indicative of the second number of symbol errors in said first property set.

9. The apparatus according to claim 7, further comprising an encoder for receiving the initial property set and generating a third property set using a noise robust mapping, and the processor determining the second number of symbol errors in the first property set by determining the difference between said first and third property sets.

10. The method according to claim 1, wherein the maximum number of symbol errors is greater than said classification threshold.

* * * * *